United States Patent [19]

Degen et al.

[11] Patent Number: 4,464,181
[45] Date of Patent: Aug. 7, 1984

[54] MIXTURES OF BENZISOTHIAZOLE MONO-AZO DYES FOR CELLULOSE ACETATE

[75] Inventors: Helmut Degen, Frankenthal; Johannes P. Dix, Neuhofen; Norbert Grund; Guenter Hansen, both of Ludwigshafen; Reinhold Krallmann, Weisenheim, all of Fed. Rep. of Germany

[73] Assignee: BASF Aktiengesellschaft, Ludwigshafen, Fed. Rep. of Germany

[21] Appl. No.: 457,223

[22] Filed: Jan. 11, 1983

Foreign Application Priority Data

[30] Feb. 12, 1982 [DE] Fed. Rep. of Germany .... 3205044

[51] Int. Cl.³ .............................................. C09B 29/00
[52] U.S. Cl. .................................... 8/639; 8/691; 8/921
[58] Field of Search .................................. 8/639, 691

[56] References Cited

U.S. PATENT DOCUMENTS 3,455,898  7/1969  Seefelder et al. ................... 260/158
4,119,621 10/1978  Hansen et al. ..................... 260/158

FOREIGN PATENT DOCUMENTS 2030163  4/1980  United Kingdom
2030169  4/1980  United Kingdom Primary Examiner—A. Lionel Clingman
Attorney, Agent, or Firm—Oblon, Fisher, Spivak, McClelland & Maier

[57] ABSTRACT

Dye mixtures which comprise two or more dyes of the formula

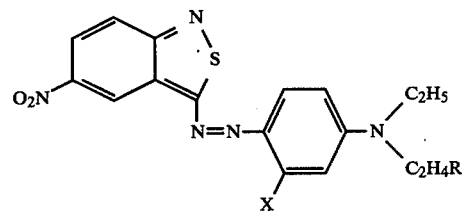

ps where X is hydrogen, methyl or chlorine, and R is a radical of the formula $OR^1$, $OCOCH_3$, $OCOC_2H_5$,

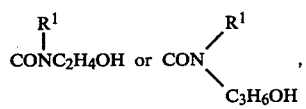

$R^1$ being hydrogen or $C_1$–$C_4$-alkyl, are very useful for dyeing cellulose esters.

3 Claims, No Drawings

MIXTURES OF BENZISOTHIAZOLE MONO-AZO DYES FOR CELLULOSE ACETATE

The present invention relates to dye mixtures which comprise two or more dyes of the formula

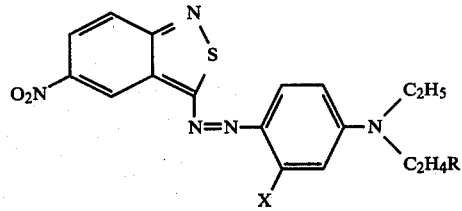

where X is hydrogen, methyl or chlorine, and R is a radical of the formula $OR^1$, $OCOCH_3$, $OCOC_2H_5$,

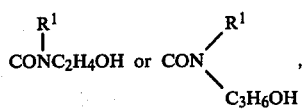

$R^1$ being hydrogen or $C_1$–$C_4$-alkyl.

X is preferably methyl or hydrogen, and R is preferably OH,

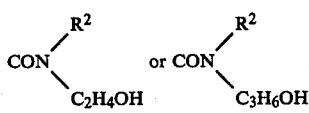

where $R^2$ is hydrogen, methyl or ethyl.

Preferred mixtures contain, in addition to any impurities present, 2 components about in a ratio of from 20:80 to 80:20, preferably from 40:60 to 60:40. The novel mixtures can be prepared either by carrying out the coupling with a mixture of the appropriate coupling components or by mixing the individual dyes mechanically.

Compared with the individual components, the mixtures according to the invention are distinguished by an affinity which is substantially temperature-independent in the range from 70° to 90° C., very good build-up and higher color strength. As a result of these properties, they are very suitable for dyeing cellulose esters, eg. secondary acetate rayon and triacetate, in from blue to black hues, and for this purpose can replace the anthraquinone dyes frequently used.

The fastness properties of the dyeings obtained, in particular the wetfastness, fastness to nitric oxide and lightfastness, are very good.

If very high heatfastness is not required, the dyes are also suitable for dyeing synthetic polyesters.

In the Examples which follow, parts and percentages are by weight, unless stated otherwise.

EXAMPLE 1

15 parts of nitrosylsulfuric acid containing 12.4% of $N_2O_3$ were added to 9.7 parts of 3-amino-5-nitro-2,1-benzisothiazole in 100 parts of 85% strength sulfuric acid at 0°–5° C. The solution was stirred for 3 hours at this temperature, and then added dropwise, in the course of 20 minutes, to a mixture of 7.5 parts of N-ethyl-N-(N'-methyl-N'-(2-hydroxyethyl)-aminocarbonylethyl)-aniline, 3.6 parts of N-ethyl-N-hydroxyethyl-m-toluidine, 230 parts by volume of 35% strength sodium formate solution, 0.5 part of amidosulfonic acid, 250 parts of ice and 50 parts of water. After coupling was complete, the mixture was gradually heated to 60° C. in the course of 5–6 hours, and the product was filtered off under suction, washed neutral, and dried at 60° C. under reduced pressure. In this manner, 16 parts of a mixture of the composition

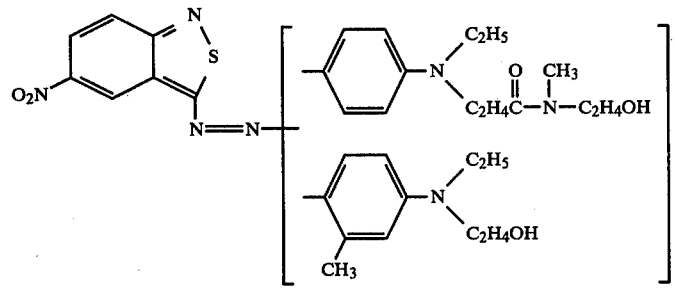

were obtained. This mixture dyed cellulose acetate fibers in very fast deep blue hues.

EXAMPLE 2

50 parts of each of the individual dyes

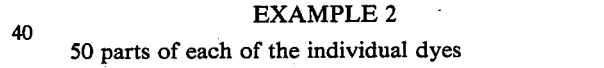

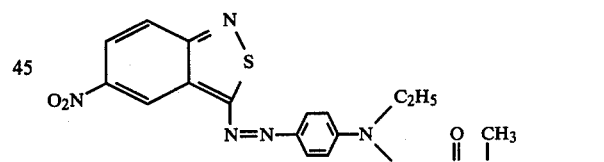

and

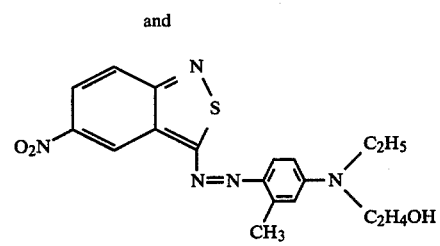

prepared by a procedure similar to that described in Example 1 were mixed in a ball mill, and gave 100 parts of a novel dye mixture which dyed cellulose esters in deep blue hues with very good all-round fastness properties.

The dyes listed in the Table below were also prepared by coupling a mixture of the coupling components using a procedure similar to that described in Example 1, or by mixing the individual components mechanically, using a procedure similar to that described in Example 2.

| Example No. | Component 1 X | Component 1 R | Component 2 X | Component 2 R | Ratio of components in the mixture |
|---|---|---|---|---|---|
| 3 | H | $\underset{\underset{C_2H_4OH}{\overset{CH_3}{|}}}{\overset{\overset{O}{\|}}{C-N}}$ | $CH_3$ | OH | 20:80 |
| 4 | H | $\underset{\underset{C_2H_4OH}{\overset{CH_3}{|}}}{\overset{\overset{O}{\|}}{C-N}}$ | $CH_3$ | OH | 40:60 |
| 5 | H | $\underset{\underset{C_2H_4OH}{\overset{CH_3}{|}}}{\overset{\overset{O}{\|}}{C-N}}$ | $CH_3$ | OH | 80:20 |
| 6 | H | $\underset{\underset{C_2H_4OH}{\overset{CH_3}{|}}}{\overset{\overset{O}{\|}}{C-N}}$ | H | $\overset{\overset{O}{\|}}{C}-NH-C_2H_4OH$ | 20:80 |
| 7 | H | $\underset{\underset{C_2H_4OH}{\overset{CH_3}{|}}}{\overset{\overset{O}{\|}}{C-N}}$ | H | $\overset{\overset{O}{\|}}{C}-NH-C_2H_4OH$ | 40:60 |
| 8 | H | $\underset{\underset{C_2H_4OH}{\overset{CH_3}{|}}}{\overset{\overset{O}{\|}}{C-N}}$ | H | $\overset{\overset{O}{\|}}{C}-NH-C_2H_4OH$ | 60:40 |
| 9 | H | $\underset{\underset{C_2H_4OH}{\overset{CH_3}{|}}}{\overset{\overset{O}{\|}}{C-N}}$ | H | $\overset{\overset{O}{\|}}{C}-NH-C_2H_4OH$ | 80:20 |
| 10 | H | $\underset{\underset{C_2H_4OH}{\overset{CH_3}{|}}}{\overset{\overset{O}{\|}}{C-N}}$ | H | OH | 20:80 |
| 11 | H | $\underset{\underset{C_2H_4OH}{\overset{CH_3}{|}}}{\overset{\overset{O}{\|}}{C-N}}$ | H | OH | 40:60 |
| 12 | H | $\underset{\underset{C_2H_4OH}{\overset{CH_3}{|}}}{\overset{\overset{O}{\|}}{C-N}}$ | H | OH | 60:40 |
| 13 | H | $\underset{\underset{C_2H_4OH}{\overset{CH_3}{|}}}{\overset{\overset{O}{\|}}{C-N}}$ | H | OH | 80:20 |
| 14 | H | $\underset{\underset{C_2H_4OH}{\overset{CH_3}{|}}}{\overset{\overset{O}{\|}}{C-N}}$ | H | $\overset{\overset{O}{\|}}{C}-NH-C_3H_6OH$ | 20:80 |
| 15 | H | $\underset{\underset{C_2H_4OH}{\overset{CH_3}{|}}}{\overset{\overset{O}{\|}}{C-N}}$ | H | $\overset{\overset{O}{\|}}{C}-NH-C_3H_6OH$ | 40:60 |
| 16 | H | $\underset{\underset{C_2H_4OH}{\overset{CH_3}{|}}}{\overset{\overset{O}{\|}}{C-N}}$ | H | $\overset{\overset{O}{\|}}{C}-NH-C_3H_6OH$ | 60:40 |
| 17 | H | $\underset{\underset{C_2H_4OH}{\overset{CH_3}{|}}}{\overset{\overset{O}{\|}}{C-N}}$ | H | $\overset{\overset{O}{\|}}{C}-NH-C_3H_6OH$ | 80:20 |
| 18 | $CH_3$ | $\underset{\underset{C_2H_4OH}{\overset{CH_3}{|}}}{\overset{\overset{O}{\|}}{C-N}}$ | H | OH | 20:80 |
| 19 | $CH_3$ | $\underset{\underset{C_2H_4OH}{\overset{CH_3}{|}}}{\overset{\overset{O}{\|}}{C-N}}$ | H | OH | 40:60 |
| 20 | $CH_3$ | $\underset{\underset{C_2H_4OH}{\overset{CH_3}{|}}}{\overset{\overset{O}{\|}}{C-N}}$ | H | OH | 60:40 |
| 21 | $CH_3$ | $\underset{\underset{C_2H_4OH}{\overset{CH_3}{|}}}{\overset{\overset{O}{\|}}{C-N}}$ | H | OH | 80:20 |

-continued

| Example No. | Component 1 | | Component 2 | | Ratio of components in the mixture |
|---|---|---|---|---|---|
| | X | R | X | R | |
| 22 | CH₃ |  | H | OH | 40:60 |

EXAMPLE 23 (Dyeing)

100 parts of a cellulose 2½-acetate yarn were dyed for 60 minutes at 80° C. in a bath containing 2,000 parts of water, 0.35 part of the finely divided dye mixture from Example 1, and 3 parts of the reaction product obtained from 1 mole of castor oil with 40 moles of ethylene oxide.

The deep blue dyeing obtained had excellent light-fastness and fastness to nitric oxide, and very good wet-fastness.

EXAMPLE 24 (Print)

A cellulose triacetate fabric was printed with a paste obtained from 330 parts of water, 20 parts of the finely divided dye from Example 2, 640 parts of a starch gum paste and 10 parts of triisobutyl phosphate. After drying, the printed fabric was steamed for 15 minutes at 2.5 bar pressure.

A very fast deep blue print was obtained.

We claim:

1. A dye mixture for the dyeing of cellulose acetate esters, which comprises: an admixture of two dyes of the formula:

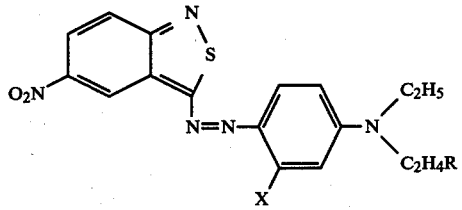

in a ratio of from 20:80 to 80:20, wherein X is hydrogen, methyl or chlorine, and R is a radical of the formula: OR¹, OCOCH₃, OCOC₂H₅,

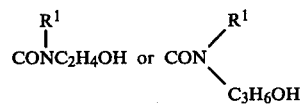

said radical R¹ being hydrogen or C₁–C₄ alkyl.

2. The mixture as claimed in claim 1, wherein X is methyl or hydrogen, R is OH,

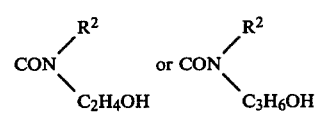

and R² is hydrogen, methyl or ethyl.

3. The mixture as claimed in claim 1, wherein said dye mixture is a combination of the following two compounds:

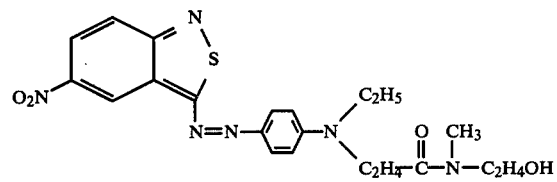

and

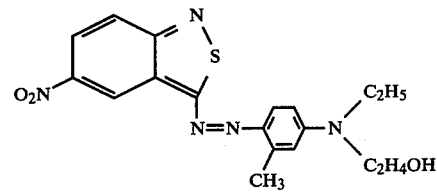

* * * * *